United States Patent [19]

Lewis

[11] Patent Number: 4,810,030
[45] Date of Patent: Mar. 7, 1989

[54] SHADE FOR CARS SEATS AND THE LIKE

[76] Inventor: Sheila S. Lewis, 2868 No. Highway 162, Eden, Utah 84310

[21] Appl. No.: 221,507

[22] Filed: Jul. 19, 1988

[51] Int. Cl.<sup>4</sup> ............................................. A47C 7/10
[52] U.S. Cl. ...................................... 297/184; 5/414; 135/96; 297/250
[58] Field of Search ...................... 297/184, 465, 250; 135/900, DIG. 5, 96, 104; 5/414, 416

[56] References Cited

U.S. PATENT DOCUMENTS

| 3,241,160 | 3/1966 | Escobar | 297/184 X |
| 4,232,692 | 11/1980 | Atkins | 5/414 X |
| 4,583,779 | 4/1986 | Myers | 297/184 |
| 4,733,906 | 3/1988 | Davis et al. | 297/184 |
| 4,761,032 | 8/1988 | Sanchez et al. | 297/184 |

Primary Examiner—James T. McCall
Attorney, Agent, or Firm—B. Deon Criddle

[57] ABSTRACT

A shade for use with infants and children car seats and the like having a seat and back member that fits into the seat and accomodates strap restraints and a hood that attaches to the seat and back member to project as a canopy from a back portion of the seat and back member.

5 Claims, 1 Drawing Sheet

U.S. Patent  Mar. 7, 1989  4,810,030
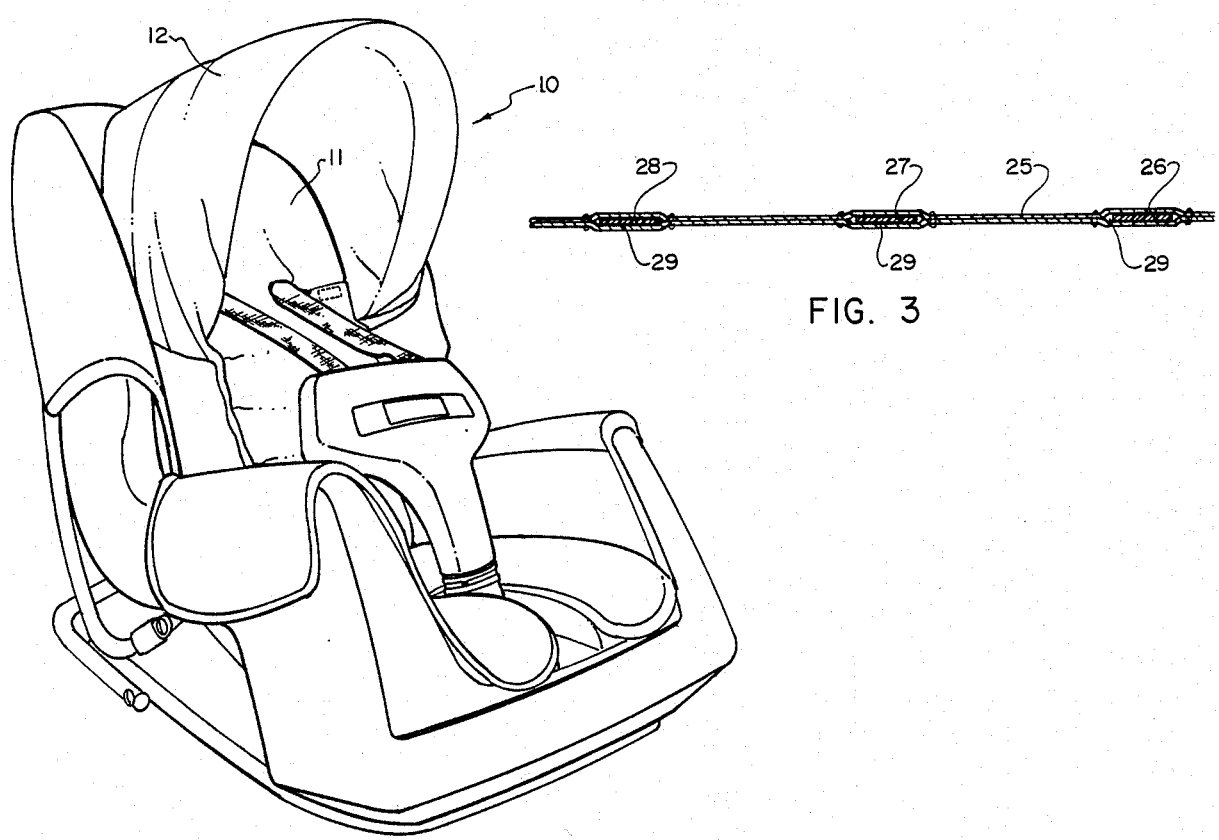
FIG. 1
FIG. 3
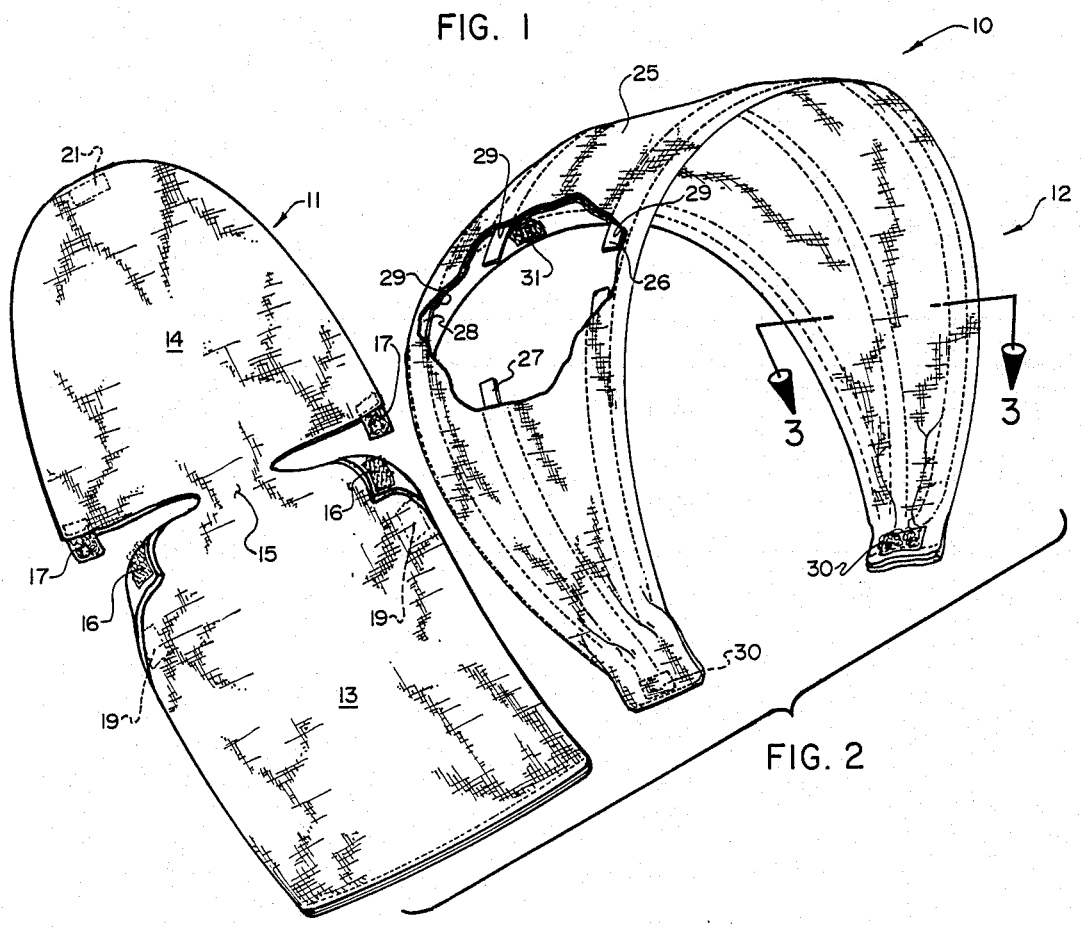
FIG. 2

SHADE FOR CARS SEATS AND THE LIKE

BRIEF DESCRIPTION OF THE INVENTION

1. Field of the Invention

The present invention relates to seats used on automobiles for the comfort and safety of infants and small children.

2. Prior Art

The need for seats that can be secured to the usual automobile seats and that well provide for the comfort and safety of infants and children has long been recognized. Federal and State laws have been passed requiring the use of such seats and their use when transporting infants and children.

Car seats have now been developed that provide physical protection for an infant or child placed therein and that are reasonably comfortable during setting.

However, it has been found that an infant or child, securely restrained in a car seat is often unable to turn away from or to be protected from bright sunlight entering the vehicle. This is particularly true if the vehicle is equipped with a convertible top, sunroof or other fully or partially removable or sunlight penetrable top, but in any event, sunrays passing through the vehicle windows can greatly bother the infant or child.

Infant seats, with sun shades, have been known in the past. U.S. Pat. No. 3,224,806, for example, shows a baby seat with support legs and a sun shade and U.S. Pat. No. 4,293,162, discusses a sun shade for use on an infant seat that can be carried and that may be used as a car seat. Another sun shade is shown for use on a beach or lounge chair in U.S. Pat. No. 2,752,929. The sun shades shown in these aforementioned patents all have rigid support structures that are costly and difficult to assemble and use and they are truly adaptable for use only on the specific seats shown.

OBJECTS OF THE INVENTION

Principal objects of the present invention are to provide a sun shade that is adaptable for use with many existing infant and child car seat designs and that will effectively shield an occupant of the seat from sunrays entering a vehicle in which the seat is installed.

Other objects are to provide a sun shade that is adaptable for use on a wide variety of infant and child car seats and other such seats, including carrying seats, front and back pack seats and other such structures.

Still other objects are to provide a sun shade that is inexpensive to produce and that does not use any rigid frame structures that may injure an occupant.

FEATURES OF THE INVENTION

Principal features of the sun shade of the invention include a two-part construction including a flexible seat and back with connection means for a hood and pass through openings for seat restraints and a hood having resilient support struts to hold it over the head of an occupant of an infants or childs seat with which the unit is used.

Other objects and features of the invention will become apparent from the following detailed description and drawing disclosing what are presently contemplated as being the best modes of the invention.

THE DRAWING

In the drawing:

FIG. 1 is a perspective view of a sun shade of the invention, shown installed in an infants and childs safety car seat;

FIG. 2, perspective, exploded view of the seat and back member and the hood member of the invention, with the hood member partially broken away to show the interior construction thereof; and FIG. 3, a cross-sectional view, taken on the line 3-3 of FIG. 2.

DETAILED DESCRIPTION

Referring now to the drawing:

In the illustrated preferred embodiment, the shade of the invention is shown generally at 10 and includes a seat and back member 11 and a hood member 12.

As best shown in FIG. 2, the seat and back member 11 is made of fabric and preferably is two layers of fabric seamed together at their edges. The seat and back member includes a seat portion 13 that is formed as a flap and that will rest on a seat to which the shade 10 is to be attached and that will extend partially up the back of the seat and that is connected to a back portion 14 at a central connector section 15. Hook and nap tabs 16 and 17 are respectively attached to outermost rear face corners 18 of the seat portion 13 and outermost front face corners of the back portion 14, respectively.

Additional hook tabs 19 are provided at opposite side edges of the rear face of the seat portion 13 on the back face and closely adjacent to the tabs 16.

The back portion 14 has a curved outer peripheral edge 20 and another hooked tab 21 is positioned on the rear face, at the curved portion most remote from central connector 15.

The hood member 12 includes a curved fabric bonnet 25 made of two layers of fabric sewn together, at their edges.

A plurality (here shown as three) of resilient support struts 26, 27 and 28, preferably made of resilient plastic strap hold the bonnet 25 in a curved configuration. The struts 26, 27 and 28 are sewn into pockets 29 formed between the layers of fabric and the opposite ends thereof are then each gathered together and the fabric is sewn to hold the strut ends together and to form the bonnet. The bonnet thus formed has strut ends that are close together and with the struts then flaring apart as they extend from their ends to the center thereof. The fabric of the bonnet is also held by the sewing so that opposite ends are gathered and the central portion of the fabric is spread.

A napped tab 30 is provided at each gathered end of the fabric on an inside face and another napped tab 31 is provided at one edge of the fabric and centrally thereof, also on an inside face.

In use, seat and back member 11 is positioned with the seat portion 13 on a seat to receive an infant or child and the back member 14 against the backrest of the seat. Seat belt restraints are positioned to extend between the seat and back portions at opposite sides of center connector 15 and the hooked tabs 16 are each connected to an adjacent napped tab 17. With this construction it is not necessary to thread the restraint belts through any openings and the shade 10 is readily adaptable for seats having differing restraint belt arrangements.

The hood 12 is attached to the seat and back member 11 by attaching tab 31 to tab 21 and each of the tabs 30 to a tab 19. With the hood so attached it projects as a canopy from the back portion, which back portion is held against the seat back by the occupant thereof. At the same time the tendency of the ends of the resilient struts 26, 27 and 28 to spring apart holds the seat and back portions stretched taut. The seat and back member and hood thus become mutually supporting members.

The shade of the invention is easily and inexpensively constructed, is attractive and is adaptable for use with a great many car safety seats and other seats used by infants and children.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A shade for use with infants and children seats comprising a seat and back member made of a sheet of flexible fabric, and having a seat portion and a back portion, said seat and back portions being centrally interconnected by a central connector;

a hood made of flexible fabric and having flexible struts secured thereto, said struts having their opposite ends closely adjacent one another and the central portions thereof spaced apart to hold a central portion of the fabric spread;

means for securing outer extremities of the seat portion and back portion together outwardly of the central connector; and means for releasably attaching the ends of the hood to the seat portion adjacent to the means for securing the seat portion and back portion together and for attaching an edge of the hood at a center thereof to an edge of the back portion remote from the central connector.

2. A shade as in claim 1, wherein
the struts are made of plastic strap.

3. A shade as in claim 2, wherein
the fabric is sewn at opposite ends to hold the opposite ends of the struts together and the ends of the fabric gathered 4. A shade as in claim 3, wherein the means for securing outer extremities of the seat portion and back portion together outwardly of the central connector comprises hooked tabs on one portion and napped tabs on the other portion, whereby each hooked tab engages a napped tab.

5. A shade as in claim 4, wherein the means for releasably attaching the ends of the hood to the seat portion and for attaching an edge of the hood to an edge of the back portion comprises hooked tabs on one member to be attached and napped tabs on the other such member to be attached.

* * * * *